(No Model.) 3 Sheets—Sheet 1.

F. F. RAYMOND, 2d.
HEEL NAILING MACHINE.

No. 317,199. Patented May 5, 1885.

WITNESSES
Geo. R. Johnson
J. M. Dolan

INVENTOR
F. F. Raymond 2d (No Model.)  3 Sheets—Sheet 2.

F. F. RAYMOND, 2d.
HEEL NAILING MACHINE.

No. 317,199.  Patented May 5, 1885.

WITNESSES
Geo. H. Bohman
J. M. Dolan

INVENTOR
F. F. Raymond 2d

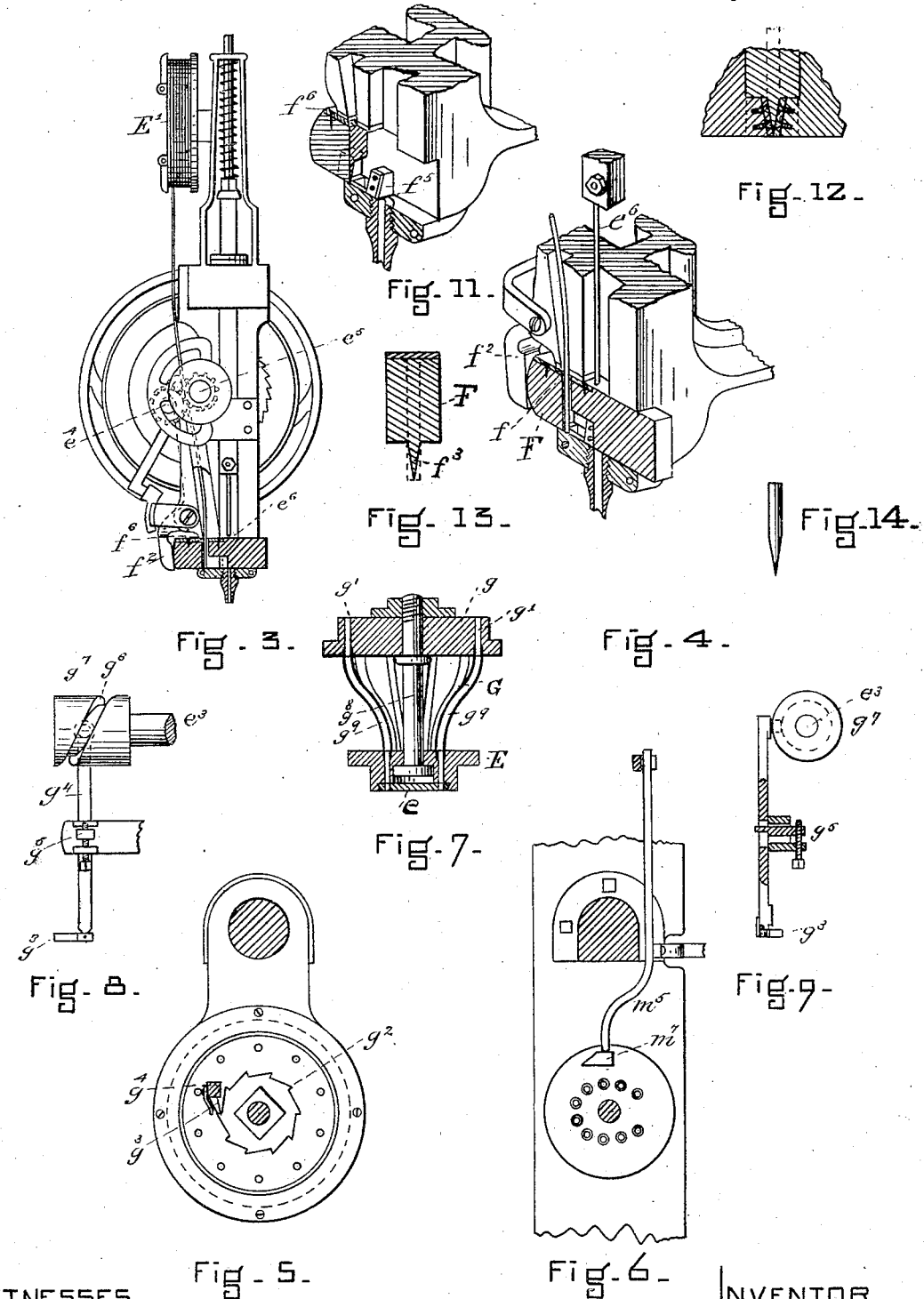

UNITED STATES PATENT OFFICE.

FREEBORN F. RAYMOND, 2D, OF NEWTON, MASSACHUSETTS.

HEEL-NAILING MACHINE.

SPECIFICATION forming part of Letters Patent No. 317,199, dated May 5, 1885.

Application filed July 17, 1884. (No model.)

*To all whom it may concern:*

Be it known that I, F. F. RAYMOND, 2d, of Newton, in the county of Middlesex and State of Massachusetts, a citizen of the United States, have invented a new and useful Improvement in Heel-Nailing Machines, of which the following is a full, clear, and exact description, reference being had to the accompanying drawings, forming a part of this specification, in which—

Figures 1, 10:
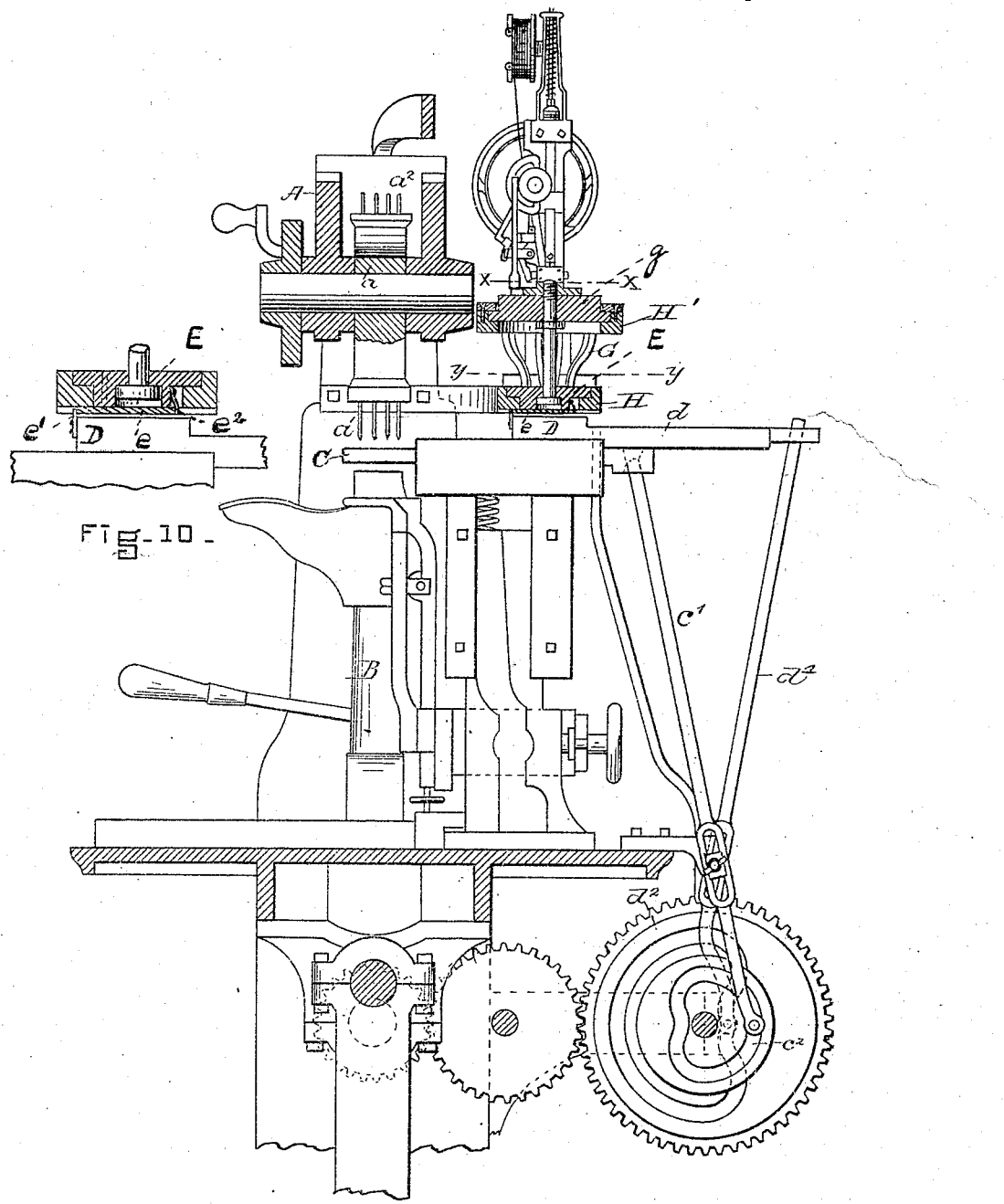
Figure 2:
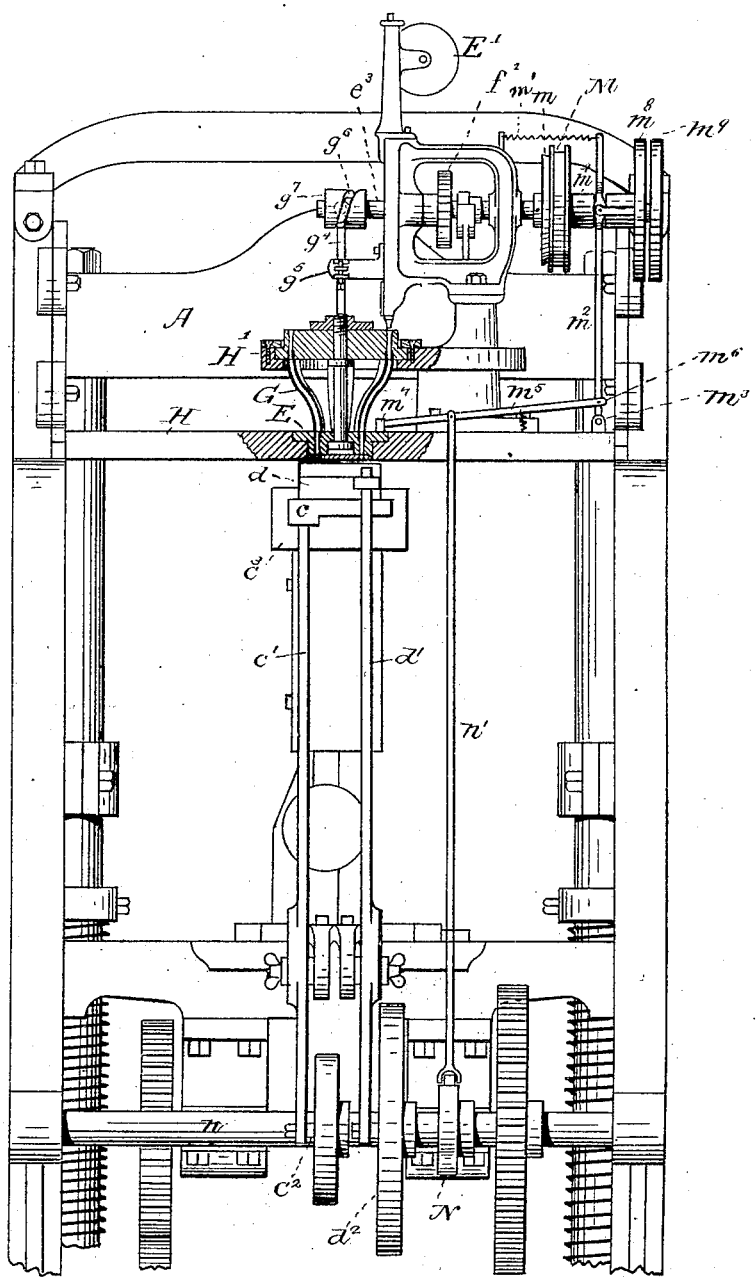

Figure 1 is a view, part in vertical section and part in elevation, of a machine containing the features of my invention. Fig. 2 is a view, part in horizontal section and part in rear elevation, thereof. Fig. 3 is a view, part in end elevation and part in section, of the nail forming and feeding devices hereinafter described. Fig. 4 is an enlarged view, part in vertical section and in perspective, of a portion of said device. Fig. 5 is a plan view below the line $x\,x$ of Fig. 1. Fig. 6 is a plan view below the line $y\,y$ of Fig. 1. Fig. 7 is a vertical section illustrating the nail distributer or holder. Figs. 8 and 9 relate to the feeding mechanism for automatically revolving the nail distributer and holder, as hereinafter specified. Fig. 10 is a detail view showing a portion of the nail-holder, its movable bottom plate, and a nail-carrier, and represents the method of operating the sliding bottom plate by the nail-carrier. Figs. 11, 12, and 13 refer especially to the devices for pointing the wire from which the nail is made, and which are hereinafter particularly referred to. Fig. 14 represents in elevation the complete nail.

The invention relates to machines for attaching heels or heel-blanks to boots and shoes; and it comprises devices or mechanism for forming and cutting nails from a single wire, for sorting or distributing them, for feeding them to a position to be driven by the drivers, for preparing the heel for their reception, and for attaching the heel.

In the drawings I have represented this mechanism as applied to a National heel-nailing machine; but it may be used in connection with any other heel-nailing machine.

Referring to the drawings, A represents the reciprocating cross-head of a National machine; $a$, the revolving head, which carries the group or gang of awls $a'$, the group or gang of drivers $a^2$, and the spanker, which may or may not have a top-lift holder. This cross-head A is reciprocated by mechanism substantially as specified in the Henderson patents, Nos. 252,215 and 259,687, or in any other desirable way.

B is the jack, having a heel-support.

C is the templet; $c$, the templet-plate, and it may be stationary, or it may be moved into or out of operative position upon its support by hand or automatically; and I have represented in the drawings the latter or automatic form, it being operated at the proper intervals by the lever $c'$ and cam $c^2$.

D is the nail-holder; $d$, the nail holder plate. The nail-holder may be moved into and out of operative position by hand or automatically. I prefer the latter, and have represented it in the drawings as automatically moved by the lever $d'$ and cam $d^2$ at proper intervals. This nail-holder has a suitable sliding plate or disk for uncovering the holes when the nail-holder has been moved into operative position and its holes are brought in register with the holes in the templet-plate. At all other times the holes are covered.

Thus far the machine does not vary from the one which has already been described in the Henderson patents above referred to, and in various patents granted to me.

To automatically feed the nail to the nail-holder I have arranged above the table $c^3$, which supports the templet and nail-holder plates, a nail-holder, E, in such a position that the nail-holder D (or "carrier," as I now prefer to call it) shall be brought immediately under the same by the cam $d^2$ and lever $d'$ upon its backward movement into position to receive the nails which have previously been deposited therein. This holder has the sliding closing plate or disk $e$, which is moved to uncover the holes therein by the nail-carrier upon its backward movement, so that when its holes are in line with the holes in the holder the closing-plate has been moved to permit the nails to drop. As, however, it is necessary to again immediately reload the holder after it has deposited its nails into the carrier, I have so timed the cam $d^2$ that it moves the carrier after the reciprocation of the drivers $a^2$ back to the position under the holder, where it pauses for an instant sufficiently long to permit the nails to drop from the holder therein, when it is moved forward a slight distance, sufficient to enable the closing-plate $e$ to be shut automatically and close the holes in the holder, so that it can be immediately refilled. The holes in the holder must correspond with the holes in the carrier. The plate $e$ is moved to open the holes by the contact of the pin $e'$ therewith on the backward movement of the carrier, and is closed by the spring $e^2$.

For feeding the wire forming the nails and advancing the nails to a position to be taken by the distributing device hereinafter described, I may use with proper modifications any of the well-known nail-forming machines of the market, and I have shown in the drawings as applicable for this purpose a portion of a machine shown and described in Patents Nos. 225,527 and 301,464, and have added to it only such devices as can be easily added to any other of the well-known machines of the market for accomplishing the result desired.

$E'$ is the reel for holding a coil of wire.

$e^3$ is the main shaft of the nail-forming mechanism. It operates the wire-feeding rolls $e^4$ $e^5$, described in said patent, and has a driver, $e^6$, which is reciprocated as therein specified.

The blank cut from the wire preferably is pointed, (see Fig. 14,) although a partially-formed string-nail may be used, if desired; but in the machine I have shown devices for forming a flat tapering point on each blank, and the wire is fed by the feeding mechanism into a hole, $f$, in the block F, which has a reciprocating movement given it by means of the cam $f'$ and lever $f^2$, and it has a V-shaped projection, $f^3$, extending from its lower portion, through which the hole $f$ extends, and which supports the lower end of the nail as it is advanced by the cutters $f^5$ to a position to be ejected by the driver $e^6$. The cutters are inclined upon their cutting-edge, and are arranged to shear a small section on a bevel from each side of the nail as the nail is moved by them.

The reciprocating block advances the nail to a position under the driver $e^6$, and the driver drives the blank down through the driveway of the machine into the distributer G. The reciprocating block is to a certain extent like that described in my pending application filed April 14, 1884, Serial No. 127,756, and it performs these offices, first, in connection with the throat-plate $f^6$, it severs the nail-blank from the wire; second, it moves the nail-blank to the cutters, and, third, it advances the nail to a position under the driver, from whence it is driven by the reciprocation of the driver into the distributer.

The distributing device comprises a circular block, $g$, in which are drilled at uniform distances apart a number of holes, $g'$, corresponding to the number of the nails to be driven in attaching a heel. This disk or block is automatically revolved by means of ratchet-wheel $g^2$, the spring-pawls $g^3$, the lever $g^4$, pivoted at $g^5$, and operated by a cam-groove, $g^6$, in the cam-cylinder $g^7$ on the main shaft $e^3$. I do not confine myself to this means of revolving the disk or block, but may use any other equivalent means for so doing. The holes in the block are so arranged as to come in line with the holes in the nozzle or feedway of the machine, and the disk or block is revolved the distance between the two holes each reciprocation of the driver. This brings the holes successively in position under the driver to receive the nail. The nails, however, must be carried automatically to the nail-holder E, and placed in their respective holes therein, and in order to do this I connect the nail-holder with the disk or block $g$ by means of a post, $g^8$, or in any other desirable way, so that it will revolve therewith and connect the holes in the disk or block with the holes in the nail-holder by means of passages or tubes $g^9$. These tubes not only connect the holes, but guide the nails, so that they are directed from the nozzle of the nail-supplying machine to their proper place in the nail-holder, and by using a circular feed-plate with holes uniformly arranged therein. This is done without giving any one tube a direction much out of a vertical line. It will thus be seen that the nails are properly distributed. This distributer comprising the nail-holder and the disk or block I have represented as being supported by the plate H and the bracket H'; but any other suitable support therefor may be used; and in Fig. 2 I show the plate H extending across from one side of the machine to the other, and broken out at its center to show the manner of supporting the nail-holder, and in the same figure I show the bracket H' in vertical section and the upper part of the distributer resting thereon. These two plates and the relation which they bear to the distributer as a whole are also shown in vertical section at right angle to these views in Fig. 1, and the office of these plates is to properly support the nail-distributer and furnish upper and lower bearings therefor, which permit its revolution therein.

In order that the machine may have sufficient time to form and distribute the nails necessary for loading the nail-carrier, I have arranged mechanism for automatically starting the machine immediately after the nail-carrier has received its load of nails from the nail-holder and started forward a short distance, as above specified, so that the time utilized in spanking the top-lift, if a spanker is used, and the time which is employed by the operator in removing his work from the jack and in placing new work thereon and in locating it in proper position may be used for forming, feeding, and distributing the nails. In order to accomplish this, it is of course evident that the shaft $e^3$ cannot be connected with any shaft of the heel-attaching machine which stops, and it must therefore either be connected with the pulley-shaft, if the pulley-shaft is run continuously, or with an independent shaft or counter-shaft which is run continuously. To such shaft the pulley-clutch M is belted. This pulley-clutch is movable on the shaft $e^3$ and engages the section $m$, which is splined to the shaft. The positively-driven member of the clutch is moved into position and held there by means of the spring $m'$ and lever $m^2$, which is pivoted at $m^3$ and connected with a hub or sleeve, $m^4$, attached to the pulley M, and I move it out of position automatically after any given number of nails have been formed and driven by means of the arm or lever $m^5$, which is pivoted at $m^6$ to the lever $m^2$, and which extends horizontally, so that a projection, $m^7$, upon the revolving disk or block E shall on each revolution thereof come in contact with its end and push it horizontally sufficiently to move the portion M of the clutch from the part $m$, and at the same time cause the friction-disk $m^8$, which is attached to the lever $m^2$, to come in contact with a friction-disk, $m^9$, which is rigidly attached to the shaft $e^3$, so that the nail feeding and forming devices are immediately stopped. The projection $m^7$ is shaped, preferably, in plan as shown in Fig. 6, the outer surface being of such shape that a portion extends behind the end of the rod $m^5$ before it comes in contact therewith to push it outward.

To start the machine at the time above indicated, I use the cam N on the shaft $n$ and the connecting-rod $n'$. This cam is so shaped that at the proper time it lifts the rod $n'$, which, being connected with the lever $m^5$, lifts it and holds it lifted until the projection $m^7$ has been moved by the revolution of the block or disk E sufficiently to permit the spring $m'$ to move the clutch M into engagement, and also the lever $m^5$ forward, to be again moved back by the projection $m^7$ after it has made a full revolution, as above indicated. I do not, however, confine myself to the specific stop-motion mechanism herein described, but may use any mechanical equivalent therefor.

To provide for the feeding of a greater or less number of nails, the distributer, comprising the disk or block, the nail-holder, and its connection, is removed and another having a greater or less number, as the case may be, substituted, in which case the stroke of the pawl will be adjusted to make a longer or shorter throw, and I prefer to make the blocks or disks of the same size, in which event, when more nails are to be used, the holes will be nearer together, and of course the feed would be the only thing that would have to be adjusted in making a change from one size to another. Of course each hole in the disk or block is connected with a corresponding hole in the holder.

In using a nail having a point formed by two bevel-surfaces it will be desirable for certain kinds of work not to use the awls, as the nails thus pointed can be driven by the drivers without first punching holes in the heel-blank.

In operation the boot or shoe is placed upon the heel-support in proper position. The heel-blank is then placed, and, if awls are to be used, the holes are formed in the heel-blank. The nail-carrier, previously charged or filled with nails from the nail-holder, is then moved forward and deposits its nails in the templet. The cross-head is again reciprocated, driving the nails into the heel-blank and heel end of the boot or shoe soles. The carrier is withdrawn, either immediately after the nails are deposited or immediately after the reciprocation of the drivers, to a position to receive from the nail-holder the next charge or load of nails, and is then immediately moved forward a short distance, and the disk or plate $e$ automatically closing the holes in the nail-holder. At that instant the nail forming and feeding mechanism is automatically set in motion, and the nails are successively cut off and distributed, and its action continues until it has cut off and distributed enough nails to load the nail-holder, when it is automatically stopped, and remains inoperative until the nail-holder discharges its nails into the nail-carrier, when it is again set in operation, as before.

It will readily be seen by this mechanism sufficient time is provided for forming from a single wire and distributing all the nails which are needed for attaching the heels, and that the nail holder and carrier are always charged with nails in advance of the time of use. It will also be seen that the efficiency of the machine is increased and that considerable saving in the cost of nailing is effected, or less help will be required for running the machine. It will also be noticed that the mechanism, in whole or in part, can be used for loading heel-blanks as well as for attaching heels, and also that the wire may be of any shaped section desired, or may be a partly-formed or string nail, as above stated.

It will be noticed that the nail-making devices are set in operation immediately after the nail-holder discharges its load into the nail-carrier, and that they continue to operate in making the nails and in feeding them to the holder until the holder has again been filled, when it automatically stops. It will also be observed that the operation of the nail making and feeding devices after they have been started by the heel-nailing devices is continuous, and that they do not stop on the completion of the heel-nailing, unless the holder has been filled with nails.

Having thus fully described my invention, I claim and desire to secure by Letters Patent of the United States—

1. In a machine for driving heel-attaching nails, the combination of a revolving nail-distributer and nail-holder adapted to receive heel-attaching nails and to automatically arrange them in the order for driving, with the sliding nail-carrier D, for receiving the nails from the distributer and nail-holder and for transferring them to a position to be simultaneously driven, all substantially as and for the purposes described.

2. The combination, in a heel-nailing machine, of a revolving nail distributer and holder, devices for making nails successively from a single wire and for delivering them in succession to the nail distributing and holding device, and a nail-carrier for delivering them to a position to be simultaneously driven, all substantially as and for the purposes described.

3. The combination, in a heel-nailing machine, of a revolving nail distributer and holder, devices for making nails successively from a single wire and for delivering them in succession to the nail distributing and holding device, a nail-carrier for delivering them to a position to be simultaneously driven, with a reciprocating head carrying a gang or group of awls, a gang or group of drivers, or a heel-spanker, substantially as described.

4. The combination, in a heel-nailing machine, of a revolving nail distributer and holder, devices for making nails successively from a single wire and for delivering them in succession to the nail distributing and holding device, a nail-carrier for delivering them to a position to be simultaneously driven, with a reciprocating head carrying a gang or group of awls, a gang or group of drivers, or a heel-spanker, and a templet, all substantially as described.

5. In a heel-nailing machine, the combination of revolving nail distributing and holding devices, devices for making nails and delivering them in succession to the nail-holder, and mechanism, substantially as described, for automatically starting and stopping said nail-making devices, substantially as set forth.

6. In heel-nailing devices, the combination of the nail-carrier D, the nail receiver, distributer, and holder E, mechanism for making nails and delivering them in succession to the receiver, and mechanism, substantially as specified, whereby upon the discharge of the nails from the holder E into the carrier D and forward movement thereof the nail-making machine is automatically set in operation to fill the nail-holder, and is then automatically stopped, all substantially as and for the purposes described.

7. The combination, in a heel-nailing machine, of nail-driving devices, nail-making devices, a revolving distributer and holder, and mechanism, substantially as described, for automatically starting the nail-making devices and adapted to be automatically set in operation immediately after the nail-holder has discharged its nails, substantially as and for the purposes described.

8. The combination of the nail-driving devices, the revolving nail distributer and holder, and a nail-carrier adapted to be moved in relation to the nail-holder by devices substantially as described.

9. The combination of the nail making and feeding devices, the revolving distributer and holder, and mechanism, substantially as specified, for connecting and operating them with the nail-carrier and the nail-driving devices, substantially as described.

10. The combination of the nail distributer and holder G, cam $g^6$, and connecting devices, substantially as specified, all substantially as and for the purposes described.

11. The combination of the transferring-block F, the driver-rod $e^6$, and the revolving distributer and nail-holder G, having holes $g'$, into which the nails are driven by the driver, the end of which is adapted to enter the holes $g'$ at the end of its downward stroke, all substantially as and for the purposes described.

FREEBORN F. RAYMOND, 2D.

Witnesses:
GEO. R. TOLMAN,
J. M. DOLAN.